United States Patent [19]

Cortelli

[11] Patent Number: 4,938,403
[45] Date of Patent: Jul. 3, 1990

[54] FREIGHT STACKING SUPPORT

[76] Inventor: David P. Cortelli, 1036 E. Street North, Suffield, Conn. 06078

[21] Appl. No.: 304,579

[22] Filed: Feb. 1, 1989

[51] Int. Cl.⁵ ............................................. B60R 11/00
[52] U.S. Cl. ................................. 224/310; 224/42.32; 296/3; 410/129; 410/142; 211/105.1; 211/123; 211/206
[58] Field of Search ............... 224/42.32, 42.33, 42.38, 224/42.39, 42.42, 42.43, 42.44, 42.45 R, 273, 310, 322, 323; 410/121, 122, 129, 135, 140–148, 151, 152; 211/7, 105.1, 123, 124, 204, 206; 286/3

[56] References Cited

U.S. PATENT DOCUMENTS

| | | | |
|---|---|---|---|
| 2,570,802 | 10/1951 | Hatteburg | 296/3 |
| 2,720,414 | 10/1955 | Hart | 224/273 |
| 2,770,471 | 11/1956 | Scott | 410/135 |
| 3,698,760 | 10/1972 | Lane | 296/50 |
| 3,738,498 | 6/1973 | Handley | 211/105.1 |
| 4,138,046 | 2/1979 | De Freze | 224/42.42 |
| 4,152,020 | 5/1979 | Brown et al. | 296/3 |
| 4,389,067 | 6/1983 | Rubio | 296/50 |
| 4,405,170 | 9/1983 | Raya | 296/10 |
| 4,494,896 | 1/1985 | Di Franco | 410/148 |
| 4,630,990 | 12/1986 | Whiting | 414/462 |
| 4,650,383 | 3/1987 | Hoff | 410/149 |
| 4,753,355 | 6/1988 | Hall et al. | 211/105.1 |
| 4,770,458 | 9/1988 | Burke et al. | 296/3 |
| 4,772,165 | 9/1988 | Bartkus | 410/139 |
| 4,779,916 | 10/1988 | Christie | 296/3 |

Primary Examiner—Henry J. Recla
Assistant Examiner—R. M. Fetsuga
Attorney, Agent, or Firm—Donald S. Holland

[57] ABSTRACT

An apparatus is disclosed for supporting oversized freight above the tailgate of a pickup truck, while affording normal utilization of the tailgate. In the preferred embodiment, the invention comprises two brackets that sit upon opposing rear edges of side walls of a pickup truck bed, near the tailgatae. A support beam passes through an opening in one bracket and is received in a slot in the opposing bracket. Ends of the support beam lie within each bracket and are held by securing rods passing through the brackets and beam ends. The bracket with the opening has a pivotable cap covering the opening to afford rapid deployment of the support beam. The cap is on the side of the bracket facing away from the opposing bracket. To deploy the beam, the operator simply pivots open the cap, slides the beam through the opening until one end lies in each bracket and then closes the cap and inserts a securing rod through each bracket and beam end. A second embodiment is disclosed in which the support beam is vertically adjustable with respect to the pickup truck bed.

11 Claims, 3 Drawing Sheets

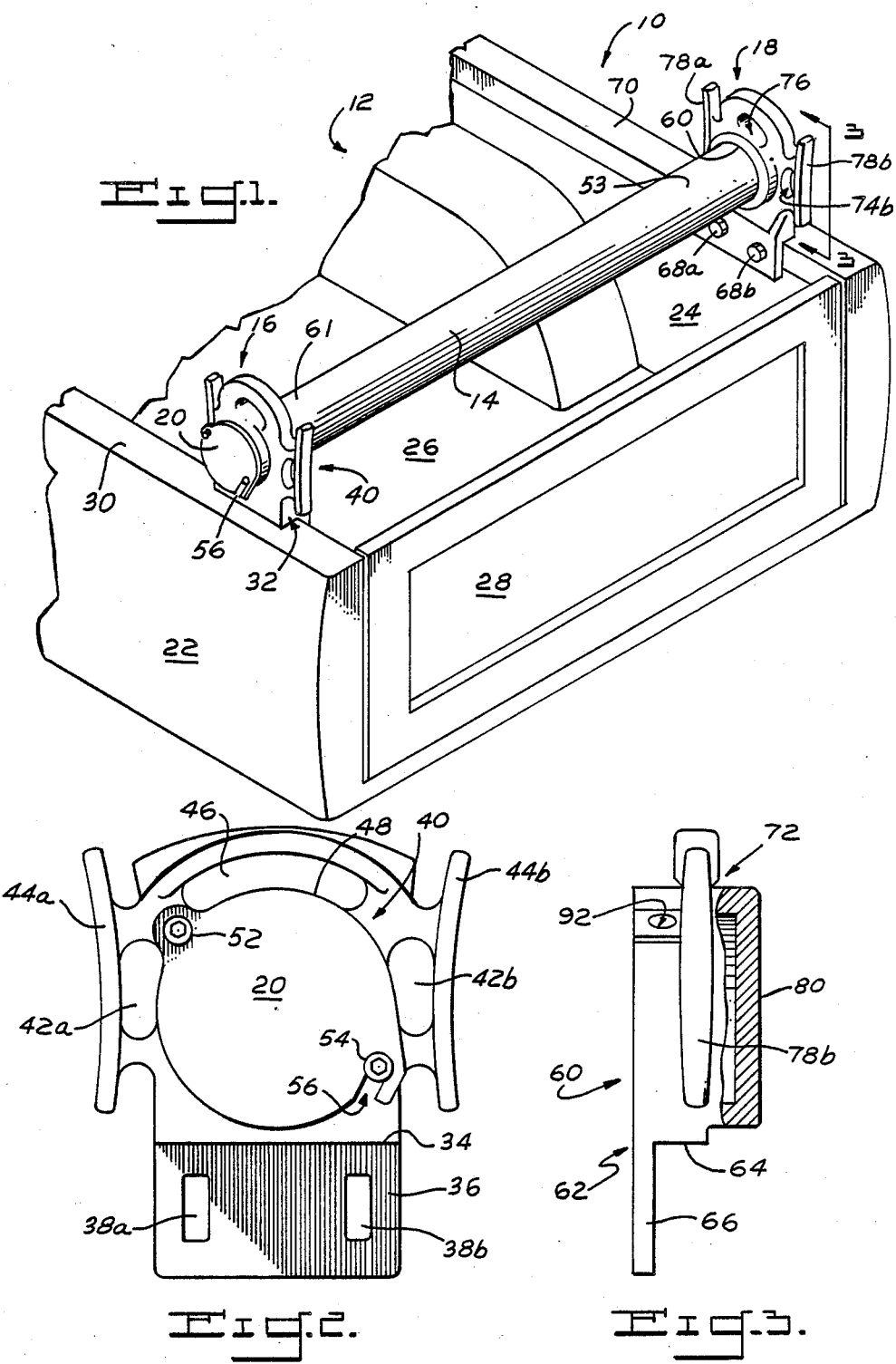

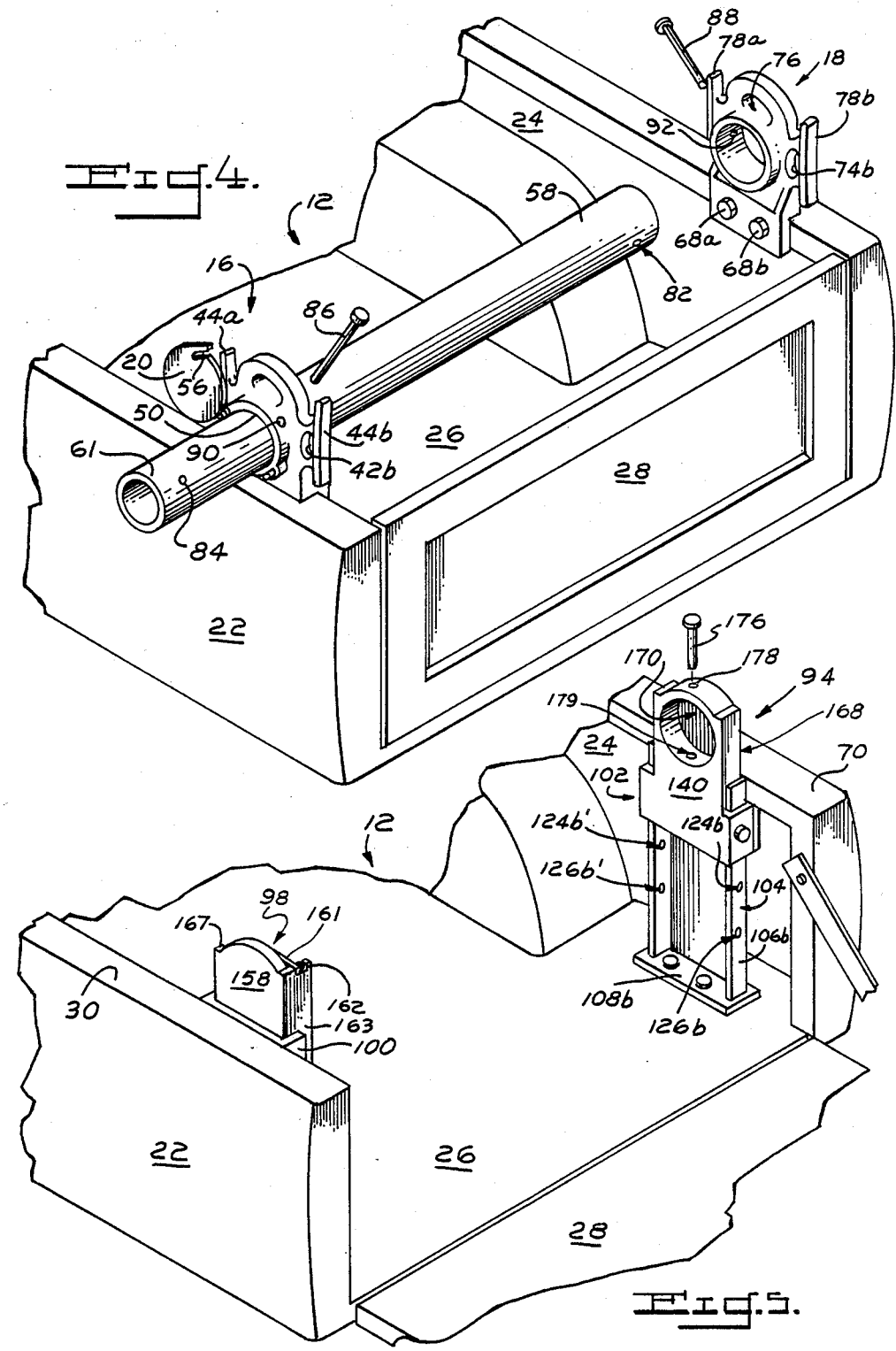

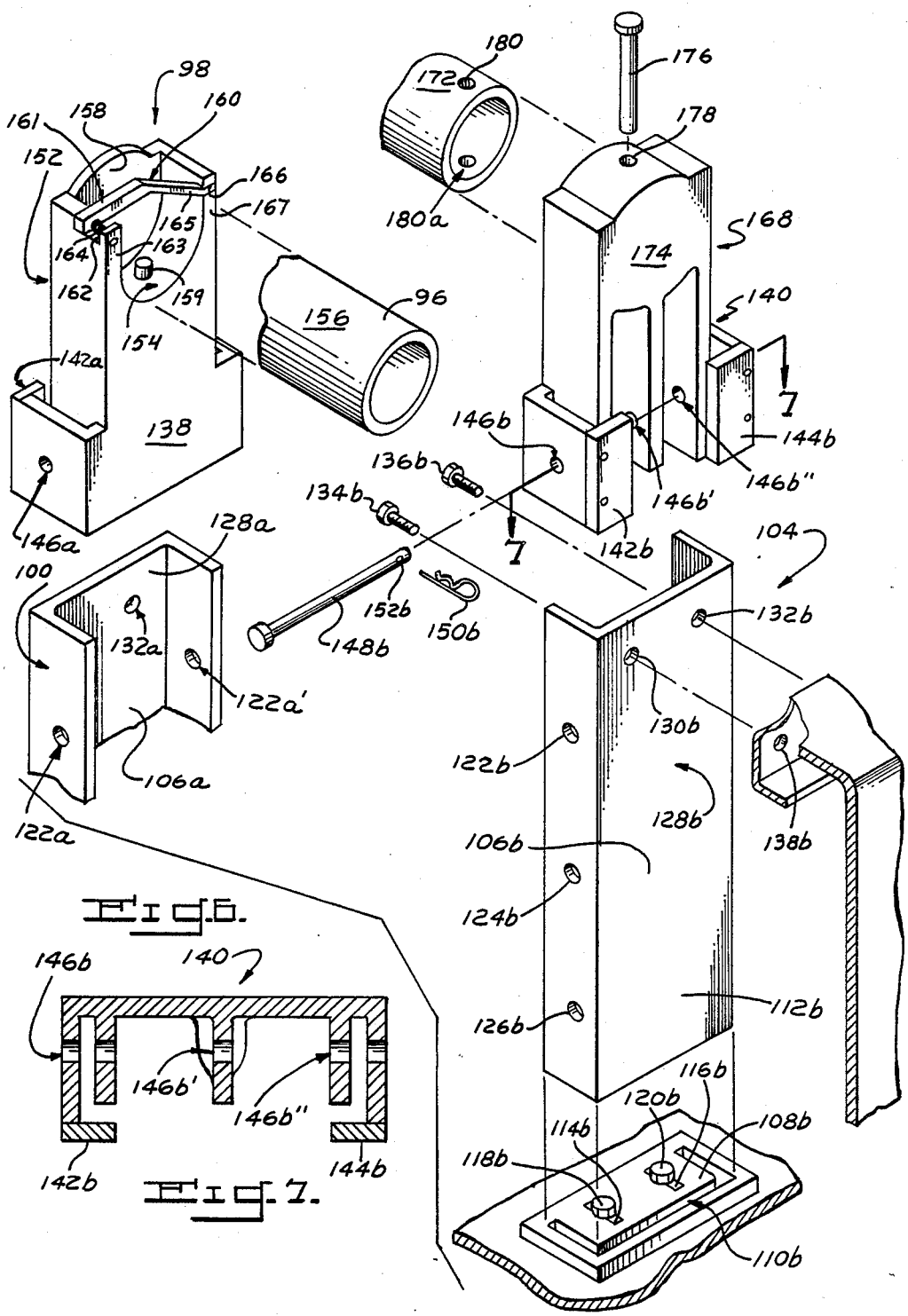

FREIGHT STACKING SUPPORT

BACKGROUND OF THE INVENTION

The present invention relates to devices for enhancing the durability and freight handling capacity of pickup trucks.

Pickup trucks are commonly used to transport small amounts of freight over short distances. A pickup truck bed, which holds the freight, is typically a rectangular box-like shape with an open top. A wall of the bed furthest from the truck's passenger compartment is referred to as a tailgate. It can be unlatched from the bed's side walls and pivotted downwardly from a vertical to a horizontal position.

When the tailgate is horizontal or "flat", freight can be easily loaded over it and onto the bed. When the tailgate is raised to its upright position and latched to the sidewalls, it secures the freight within the bed by preventing rear ward movement, as the truck is operated.

Occasionally, the pickup truck operator has to transport articles that are longer than the bed. Typical examples are canoes, rowboats, ladders, boards and other long or bulky items. Usually one end of such an article is placed in the bed, next to the passenger compartment. The other end protrudes beyond the tailgate. In order to prevent the article from sliding out of the bed, the gate is kept raised and a rear portion of the article rests on top of it. This arrangement causes the articles to rest in an angular alignment, with its center of gravity well within the truck's bed. Consequently, the possibility of its sliding rearwardly, out of the truck, during transportation is significantly decreased.

Unfortunately, placing large articles on top of an upright tailgate causes problems. First, tailgates are not designed as weight bearing structures in that position. Because the articles of freight are not lying flat, a great deal of weight is brought to bear against the top edge of the tailgate. Persistent use of a tailgate in that manner causes excessive wear. Second, when freight is resting on an upright tailgate, the tailgate cannot be pivoted downward without great difficulty. Therefore, the volume of the bed between the freight and the floor of the bed cannot be efficiently utilized. If additional freight is stored there, the article resting on the tailgate's top edge would have to be removed to allow the tailgate to pivot open in order to gain access to that freight.

Devices have been developed that afford protection to the top edge of the tailgate when it is used to support freight. Most of these devices, however, are designed to be affixed to the tailgate. Therefore, they do not allow the tailgate to be opened and closed without moving the supported freight. Additionally, many of these devices are of a semi-permanent nature, utilizing bolts and nuts for securing a support member that transverses the top edge of the tailgate. They do not afford rapid assembly for temporary use during transportation of oversized freight. Therefore, they remain in place, subject to wear and accidental disassembly during normal pickup truck use.

Accordingly, it is the primary object of the present invention to provide a freight stacking support which supports oversized freight above a tailgate of a pickup truck.

It is another object to provide a freight stacking support which allows a tailgate of a pickup truck to be pivoted from its closed, or upright, position to its open, or flat, position, while the freight stacking support is deployed and supporting freight over the tailgate.

It is yet another object to provide a freight stacking support that may be easily and rapidly assembled for supporting oversized freight above a tailgate of a pickup truck and which can be readily disassembled for normal operation of the truck.

It is a further object to provide a freight stacking support which supports oversized freight at varying adjustable heights above a tailgate of a pickup truck.

SUMMARY OF THE INVENTION

A simple apparatus is disclosed for supporting oversized freight above a tailgate of a pickup truck, while affording normal utilization of the tailgate.

In the preferred embodiments, the invention comprises two brackets that are affixed to opposing top rear edges of side walls of a pickup truck bed. A support beam passes through a throughbore bracket and is received in a receiving slot in the other, opposed receiving bracket. Ends of the support beam lie within each bracket and are secured to the brackets by securing rods passing through each bracket and beam end. The throughbore bracket has a pivotable cap that covers its opening on the side facing away from the opposed receiving bracket.

To deploy the freight stacking support, the operator pivots open the cap covering the opening in the throughbore bracket. The support beam is passed through the bracket until one end lies in each bracket. The operator then pivots the cap back, closing the throughbore opening, thereby preventing further longitudinal movement of the beam. Securing rods are then passed through each bracket and beam end to further secure the beam and prohibit axial movement of the beam. The securing rods are held in position by friction and gravity in one embodiment, and by cotter pins in another. To disassemble the freight stacking support, the operator simply removes the securing rods, reopens the pivotable cap and slides the beam out.

The above and other objects and advantages of this invention will become more readily apparent when the following description is read in conjunction with the accompanying drawings.

BRIEF DESCRIPTION OF THE DRAWINGS

FIG. 1 is a raised perspective view of a freight stacking support constructed in accordance with the present invention, showing the freight stacking support in a deployed mode, on a pickup truck bed, wherein a support beam interconnects two brackets;

FIG. 2 is a front plan view of a throughbore bracket, showing a pivotable cap in a closed position, covering the throughbore;

FIG. 3 is a fragmentary side plan view, taken along line 3—3 of FIG. 1, showing a receiving bracket;

FIG. 4 is a raised perspective view of the freight stacking support shown in FIG. 1, with the support beam partially inserted through the throughbore bracket and securing rods shown displaced from securing rod slots in the brackets;

FIG. 5 is a raised perspective view of an alternative embodiment of the freight stacking support, showing a cradle and mounting bracket supported on adjustable bracket support struts that are secured to a floor of the pickup truck bed, wherein the support beam is not deployed;

FIG. 6 is an exploded fragmentary view of the alternative embodiment of the freight stacking support shown in FIG. 5, wherein fragmentary portions of the support beam are shown; and FIG. 7 is a cross-sectional view, taken along line 7—7 of FIG. 6, of a base of the brackets shown in FIG. 6.

DETAILED DESCRIPTION OF THE PREFERRED EMBODIMENTS

Referring to the drawings in detail, the preferred embodiment of a freight stacking support is shown and generally designated by the reference numeral 10. As best shown in FIG. 1, the invention 10 is affixed to a standard pickup truck bed 12. It basically comprises a support beam 14; a throughbore bracket 16 connected to one end of the support beam 14; a receiving bracket 18 connected to the other end of the support beam 14; and a pivotable cap 20 affixed to the throughbore bracket 16.

The standard pickup truck bed 12 includes a driver's side wall 22 and an opposed passenger's side wall 24, with a a floor 26 betweem them. Adjacent the floor 26 and interconnecting the two walls 22, 24 is a tailgate 28. It pivots from an upright or vertical position (see FIG. 4) to a horizontal or "flat" position (see FIG. 5).

As best shown in FIGS. 1 and 4, the throughbore bracket 16 is affixed to an upper, rear edge 30 of the driver's side wall 22. A mounting base 32 of a that bracket 16 has a step 34 and a depending lip 36. As shown in FIG. 2, the lip 36 has bolt slots 38a, 38b that receive securing bolts (not shown) to affix the bracket 16 to the wall 22. When affixed, as shown in FIGS. 1 and 4, the base step 34 sits upon the edge 30 of the driver's side wall 22.

As best shown in FIG. 2, an upper body 40 of the throughbore bracket 16 has side rope-tie apertures 42a, 42b on opposed sides. Rope securing posts 44a, 44b protrude from the rope tie apertures 42a, 42b. A top rope-tie aperture 46 is adjacent the top 48 of the upper body 40.

The side rope-tie apertures 42a, 42b and the top rope-tie aperture 46 surround a throughbore arcuate channel 50 in the upper body 40. In FIG. 4, the throughbore 50 is shown with the support beam 14 passing through it.

As shown in FIGS. 1, 2 and 4, the pivotable cap 20 overlies the throughbore 50. The cap 20 is secured to the upper body 40 of the throughbore bracket 16 by a pivot bolt 52 and a retaining bolt 54 on opposed edges of the pivotable cap 20. The pivot bolt 52 passes through a slot (not shown) in the cap 20 and the retaining bolt 54 engages a retaining slot 56 to secure the cap in a closed position, overlying the throughbore 50, as shown in FIGS. 1 and 2. The pivotable cap 20 pivots about the pivot bolt 52, with the retaining slot 56 disengaging the retaining bolt 54, when the cap 20 is open to expose the throughbore 50, as shown in FIG. 4.

Support beam 14 passes through the exposed throughbore 50 to deploy the freight stacking support 10. A receiving bracket end 58 of the beam 14 fits into a receiving slot or arcuate channel 60 of the receiving bracket 18 (see FIGS. 1 and 3). When the beam 14 is fully extended into the receiving slot 60, a throughbore bracket end 61 of the beam 14 rests within the throughbore 50, and the cap 20 pivots closed, overlying the throughbore 50, as shown in FIG. 1.

As best shown in FIGS. 1 and 3, the receiving bracket 18 is similar to the throughbore bracket 16, except that it has a receiving slot 60 instead of a throughbore 50. A mounting base 62 of the receiving bracket 18 includes a step 64 and a depending lip 66. Two bolts 68a, 68b pass through bolt slots (not shown) in the lip 66 to secure the receiving bracket 18 to the upper rear edge 70 of the passenger's side wall 24. An upper body 72 of the receiving bracket includes the receiving slot 60, which is surrounded by two side rope-tie apertures 74a, 74b (74a not shown) and a top rope-tie aperture 76. Rope securing posts 78a, 78b protrude from the side rope-tie apertures 74a, 74b. A support beam retaining wall 80 aligns the receiving slot 60, preventing the support beam 14 from passing through the receiving bracket 18.

As shown in FIG. 4, the receiving bracket end 58 of support beam 14 has a beam securing slot 82, and the throughbore bracket end 61 of beam 14 also has a beam securing slot 84. When the support beam 14 is fully inserted into the receiving bracket 18, the pivotable cap 20 closes, covering the throughbore and securing the support beam 14 against longitudinal movement. The beam 14 is further secured against axial rotation by a pair of securing rods 86, 88. Throughbore end securing rod 86 passes through a securing rod slot 90 in the throughbore bracket 16 and through the aligned beam securing slot 84 in the throughbore bracket end 61 of the support beam. Similarly, receiving end securing rod 88 passes through a securing rod slot 92 in the receiving bracket 18 and the aligned beam securing slot 82 in the receiving bracket end 58 of the support beam 14.

In operation, the throughbore and receiving brackets 16, 18 of the freight stacking support 10 remain bolted to the upper rear edges 30, 70 of the side walls 22, 24 of the pickup truck bed 12, even though the support beam 14 is not deployed. The rope-tie apertures 42a, 42b, 46, 74a, 74b, 76 and rope securing posts 44a, 44b, 78a, 78b assist in securing ropes and cables during general freight handling activities. When an oversized piece of freight (not shown) must be loaded, the operator simply pivots open the pivotable cap 20, exposing the throughbore 50; inserts the receiving bracket end 58 of the support beam 14 into and through the throughbore 50; passes the beam 14 along until it is seated in the receiving slot 60 of the receiving bracket 18, against the support beam retaining wall 80; closes the pivotable cap 20 over the throughbore 50; and inserts the securing rods 86, 88 through the securing rod slots 90, 92 and beam securing slots 82, 84. The freight stacking support 10 is then ready to support an oversized piece of freight, while permitting the tailgate 28 to pivot freely.

An alternative embodiment of the invention, entitled adjustable freight stacking support, is shown in FIGS. 5 and 6 and generally designated by the reference numeral 94. This adjustable freight stacking support basically comprises an adjustable support beam 96; a cradle bracket 98 connected to one end of the adjustable support beam 96; a cradle bracket support strut 100, adjustably supporting the cradle bracket 98; a mounting bracket 102 connected to the other end of the adjustable support beam 96; and a mounting bracket support strut 104, adjustably supporting the mounting bracket 102.

As best seen in FIG. 6, the cradle bracket support strut 100 and the mounting bracket support strut 104 are interchangeable and include identical "U"-shaped support channels 106a, 106b and identical strut mounting brackets 108a, 108b (strut mounting bracket 108a for the cradle bracket support strut 100, not shown). The strut mounting brackets have "U"-shaped slots 110a, 110b (110a not shown) that receive the lower ends 112a, 112b (112a not shown) of the "U"-shaped support channels 106a, 106b. Bolt slots 114a, 114b (114a not shown), 116a, 116b (116a not shown) allow floor bolts 118a, 118b (118a not shown), 120a, 120b (120a not shown) to pass through the strut mounting brackets 108a, 108b to secure them to pickup truck bed 26.

The "U"-shaped support channels 106a, 106b include height adjustment holes 122a, a', b, b' (122b' not shown), 124a, a', b, b' (124a, a', b' not shown) and 126a, a', b, b', (126a, a', b' not shown). Adjacent the top ends 128a, 128b of the support channels 106a, 106b are securing holes 130a, 130b (130a not shown), 132a, 132b. Securing bolts 134a, 134b (134a not shown), 136a, 136b (136a not shown) pass through the securing holes 130a, 130b, 132a, 132b to mounting holes 138a, a', b, b' (138a, a', b' not shown) in the upper rear edges 30, 70 of the side walls 22, 24 of the pickup truck bed 12.

As best shown in FIG. 6, the cradle bracket 98 includes an "M"-shaped mounting base 138 that is adapted to engage and vertically slide up and down the "U"-shaped support channel 106a of the cradle bracket support strut 100. Similarly, the mounting bracket 102 has an "M"-shaped mounting base 140 that engages the channel 106b of its support strut 104. As shown in FIG. 7, both "M"-shaped mounting bases 138, 140 have locking edges 142a, 142b, 144a, 144b 142a, (144a not shown) that permit the brackets 98, 102 to only move in a vertical plane, and prevent the brackets from sliding up and off of their support struts 100, 104 when the struts are secured to the upper rear edges 70, 30 of the pickup truck bed 12.

Both mounting bases 138, 140 of the brackets include positioning holes 146a, a', a'', b, b', b'' (146a', a'' not shown). Height adjusting rods 148a, 148b (148a not shown) pass through the positioning holes 146a, a', a'', b, b', b'' in the mounting bases 138, 140 and the aligned height adjustment holes 122a, a', b, b', 124a, a', b, b' or 126a, a', b, b' to secure the brackets 98, 102 at the desired height. When the height adjusting rods 148a, 148b have secured the brackets, they are held against longitudinal displacement by cotter pins 150a, 150b (150a not shown) passing through holes 152a, 152b (152a not shown) in the height adjusting rods 148a, 148b.

As best shown in FIG. 6, the cradle bracket 98 includes an upper body portion 152 which has a cradle-shaped recess or arcuate channel 154 that receives a cradle bracket end 156 of the adjustable support beam 96 when the adjustable freight stacking support is deployed. A securing plate 158 abuts the side of the cradle-shaped recess that is closest to the locking edges 142a, 144a of the cradle brackets mounting base 138. The securing plate 158 prevents longitudinal movement of the adjustable support beam 96 when it is deployed.

Cradle bracket securing post 159 is affixed to the cradle shaped recess 154 and passes through a slot (not shown) in the cradle bracket end 156 of the adjustable support beam 96 to secure the beam against longitudinal movement when deployed. The adjustable beam 96 is secured against vertical movement when deployed by a pivotal latch 160. A pivot end 161, of the pivotal latch 160, is pivotally secured within a notch 162 in a notch side 163 of the upper body portion 152 of the cradle bracket 98 by a pivot rod (not shown) and spring 164. A latch end 165, of the pivotal latch 160, is inserted into a latch slot 166 in a latch side 167 of the upper body portion 152 of the cradle bracket 98. The latch slot 166 is directly opposite the notch 162.

The spring 164 pushes the pivot end 161 of the pivotal latch 160 toward the securing plate 158. When the pivotal latch 160 is in an upright or vertical position (not shown), the cradle bracket end 156 of the adjustable support beam 96 is dropped into the cradle shaped recess 154 of the cradle bracket 98. The operator then pushes the pivotal latch 160 away from the securing plate 158 and pivots the pivotal latch downward toward the adjustable support beam 96. When the pivotal latch 160 contacts the support beam, as shown in FIG. 6, the operator allows the spring to slide the pivotal latch toward the securing plate 158 and the latch end 165 of the pivotal latch slides into the latch slot 166, thereby securing the support beam 96 against vertical movement.

As best seen in FIGS. 5 and 6, the mounting bracket 102 also includes an upper body portion 168 with a mounting hole or arcuate channel 170 that engages a mounting bracket end 172 of the adjustable support beam 96. The side of the upper body portion 168 closest to the locking edges 142b, 144b includes an adjustable support beam retaining plate 174 to secure the adjustable support beam 96 against longitudinal movement when the beam end 172 is inserted into the mounting hole 170 of the bracket 102. Mounting bracket securing rod 176 prevents axial rotation of the adjustable support beam 96 by passing through mounting bracket securing slot 178 and aligned holes 180, 180a in the mounting bracket end 172 of the adjustable support beam 96. The bottom of rod 176 rests in rod slot 179 in the base of arcuate channel 170 to further prevent movement of adjustable support beam 96.

In operation, the cradle bracket 98 and mounting bracket 102 remain affixed to their support struts 100, 104 which are secured to the pickup truck bed 12. When no oversized freight (not shown) is being carried, or when the operator simply desires to have the brackets 98, 102 out of sight, the height adjusting rods 148a, 148b are set in height adjustment holes 126a, a', b, b'. The brackets are then below the top of side walls 22, 24 of the bed 12 of the pickup truck.

To carry oversized freight, while affording use of the tailgate 28, the operator simply pulls the height adjusting rods 148a, 148b, out and slides the brackets 98, 102 up their struts 100, 104 so they are aligned with height adjustment holes 124a, a', b, b' or 122a, a', b, b', depending upon how much volume of the bed 12 is needed below the freight. The height adjusting rods 148a, 148b are then reinserted to secure the brackets 98, 102 at the chosen height. The adjustable support beam 96 is then deployed. First, the mounting bracket end 172 of the beam 96 is inserted into the mounting hole 170 of the mounting bracket 102. Then the cradle bracket end 156 of the beam 96 is dropped into the recess 154 of the cradle bracket 98 so that the cradle bracket securing post 159 is inserted into the aligned slot in the beam end 156. The pivotal latch 160 is pivoted downward so that its latch end 165 slides into the latch slot 166. The mounting bracket securing rod 176 is then passed through its securing slot 178 and the aligned hole 180 in the adjustable support beam 96. The adjustable support beam 96 is thereby secured against longitudinal and vertical movement and ready for use.

It should be understood by those skilled in the art that obvious structural modifications can be made without departing from the spirit of the invention. Accordingly, reference should be made primarily to the accompanying claims rather than the foregoing specification to determine the scope of the invention.

Having thus described the invention, what is claimed is:

1. A freight stacking support apparatus for enhancing the durability and freight handling capacity of the freight carrying beds of pickup trucks wherein the beds are of the type having two parallel, opposing side walls that extend from a passenger compartment of the truck to a pivotable tailgate between ends of the side walls, said freight stacking support comprising:

a. a pair of opposing brackets adapted to be mounted on the side walls adjacent the tailgate such that said brackets have upper portions that extend above the side walls, said upper portion of each bracket include an arcuate channel, wherein said channels are in open-facing relationship to each other when mounted on said truck; and
   b. a support beam adapted in size and shape to span the width of the bed and to removably fit within the arcuate channels of the opposed brackets, wherein the support beam has at least one beam securing slot adjacent each of its ends and each of said brackets have pin means adapted to be received in said slots for securing the beam within the channels and thereby, positioned above the bed.

2. The freight stacking support of claim 1, wherein the apparatus further includes securing means for removably retaining the support beam within the bracket channels.

3. A freight stacking support apparatus for enhancing the durability and freight handling capacity of the freight carrying beds of pickup trucks, wherein the support comprises:

a. a support beam having two ends;
   b. a throughbore bracket removably affixed to a first end of the support beam, said bracket comprising:
      i. an upper body having a central throughbore that permits the support beam to pass through the bracket;
      ii. a pivotable cap affixed to the upper body, overlying the central throughbore, wherein the cap pivots open to permit the support beam to enter and pass through the throughbore and closes to capture an end of the beam within the bracket;
      iii. a mounting base adapted to be removably mounted upon a side wall of the freight carrying bed of the pickup truck;
   c. a receiving bracket removably affixed to a second end of the support beam, said bracket comprising:
      i. an upper body having a central receiving slot that receives said second end of the support beam;
      ii. a retaining wall connected to the receiving slot, wherein the second end of the support beam housed within the receiving slot abuts the retaining wall;
      iii. a mounting base adapted to be removably mounted upon a side wall of the freight carrying bed of the pickup truck; and
   d. wherein the receiving bracket is adapted to be mounted upon a portion of a side wall of the freight carrying bed of the pickup truck that is directly opposite the portion of the side wall upon which the throughbore bracket is adapted to be mounted, whereby the second end of the support beam can enter and pass through the throughbore in the throughbore bracket and said second end can enter the receiving slot of the receiving bracket and abut the retaining wall of said receiving bracket while the first end of the support beam is captured within the throughbore bracket.

4. The freight stacking support of claim 3, wherein the support beam ends are further secured within the throughbore and receiving brackets by a securing rod and slot arrangement comprising two securing rods; securing rod slots in each bracket; and securing slots adjacent each beam end, whereby the securing rods pass through the securing rod slots and securing slots when the beam ends are within the brackets and the securing slots adjacent the beam ends are aligned with the securing rod slots in each bracket.

5. The freight stacking support of claim 3, wherein the pivotable cap is connected to the throughbore bracket by a pivot post and retaining slot arrangement comprising a pivot post affixed to the upper body of the throughbore bracket which post passes through the cap adjacent its outer edge; a retaining bolt affixed to the upper body of the throughbore bracket that projects out from the upper body, parallel to the pivot post, in a position adjacent the opposite edge of the cap from the edge through which the pivot post passes; and a retaining slot adjacent the edge of the cap that embraces the retaining bolt when the pivotable cap is closed.

6. A freight stacking support apparatus for enhancing the durability and freight handling capacity of the freight carrying beds of pickup trucks, wherein the support comprises:

a. a support beam having two ends;
   b. a throughbore bracket removably affixed to a first end of the support beam, said bracket comprising:
      i. an upper body having a central throughbore that permits the support beam to pass through the bracket;
      ii. a pivotable cap affixed to the upper body overlying the central throughbore, wherein the cap is connected to the upper body by a pivot post and retaining slot arrangement comprising a pivot post affixed to the upper body of the throughbore bracket which post passes through the cap adjacent its outer edge; a retaining bolt affixed to the upper body of the throughbore bracket that projects out from upper body, parallel to the pivot post, in a position adjacent the opposite edge of the cap from the edge through which the pivot post passes; and a retaining slot adjacent the edge of the cap that embraces the retaining bolt when the pivotable cap is closed, wherein the cap pivots open to permit the support beam to enter and pass through the throughbore and closes to capture an end of the beam within the throughbore bracket;
   c. a receiving bracket removably affixed to a second end of the support beam, said bracket comprising:
      i. an upper body having a central receiving slot that receives said second end of the support beam;
      ii. a retaining wall connected to the receiving slot, wherein the second end of the support beam housed within the receiving slot abuts the retaining wall;
      iii. a mounting base adapted to be removably mounted upon a side wall of the freight carrying bed of the pickup truck; and
   d. wherein the receiving bracket is adapted to be mounted upon a portion of a side wall of the freight carrying bed of the pickup truck that is directly opposite the portion of the side wall upon which the throughbore bracket is adapted to be mounted, whereby the second end of the support beam can enter and pass through the throughbore in the throughbore bracket and said second end can enter the receiving slot of the receiving bracket and abut the retaining wall of said receiving bracket while the first end of the support beam is captured within the throughbore bracket;

e. wherein the support beam ends are secured within the throughbore and receiving brackets by a securing rod and slot arrangement comprising two securing rods; securing rod slots in each bracket; and securing slots adjacent each beam end, whereby the securing rods pass through the securing rod slots and securing slots when the beam ends are within the brackets and the securing slots adjacent the beam ends are aligned with the securing rod slots in each bracket; and f. wherein the upper body of the throughbore bracket and the upper body of the receiving bracket includes rope-tie apertures and rope-tie posts.

7. An adjustable freight stacking support apparatus for enhancing the durability and freight handling capacity of the freight carrying beds of pickup trucks, wherein the support comprises:

a. an adjustable support beam having two ends;

b. a cradle bracket removably affixed to a first end of the adjustable support beam said bracket comprising:
   i. an upper body having a cradle-shaped recess that receives the first end of the adjustable support beam;
   ii. a securing plate connected about the cradle-shaped recess that abuts the first end of the support beam resting in the recess;
   iii. a cradle bracket mounting base;

c. a cradle bracket support strut adapted to be removable connected to a sidewall of the freight carrying bed of the pickup truck that adjustably mounts the cradle bracket, comprising:
   i. a support channel which engages and adjustably mounts the mounting base of the cradle bracket;
   ii. a cradle bracket support strut mounting bracket having a groove that receives an end of the support channel and is adapted to secure it to a floor of the freight carrying bed of the pickup truck;

d. a mounting bracket removably affixed to a second end of the adjustable support beam, said bracket comprising:
   i. an upper body having a mounting hole that receives the second end of the adjustable support beam;
   ii. a retaining plate connected about the mounting hole that abuts the second end of the support beam resting in the mounting hole;
   iii. a mounting bracket base;

e. a mounting bracket support strut adapted to be removably connected to a side wall of the freight carrying bed of the pickup truck that adjustably mounts the mounting bracket, comprising:
   i. a support channel which engages and adjustably mounts the mounting base of the mounting bracket;
   ii. a mounting bracket support strut mounting bracket having a groove that receives an end of the support channel and is adapted to secure it to a floor of the freight carrying bed of the pickup truck; and f. wherein the mounting bracket support strut is adapted to be connected to a portion of a side wall of the freight carrying bed of the pickup truck that is directly opposite the portion of the side wall which the cradle bracket support strut is connected to, whereby the second end of the adjustable support beam can enter the mounting hole in the mounting bracket and abut the retaining plate therein, while the first end of the beam rests within the cradle-shaped recess and abuts the securing plate in the cradle bracket.

8. An adjustable freight stacking support apparatus for enhancing the durability and freight handling capacity of the freight carrying beds of pickup trucks, wherein the support comprises:

a. an adjustable support beam having two ends;

b. a cradle bracket removably affixed to a first end of the adjustable support beam said bracket comprising:
   i. an upper body having a cradle-shaped recess that receives the first end of the adjustable support beam;
   ii. a securing plate connected to the cradle-shaped recess that abuts the first end of the support beam resting in the recess;
   iii. a cradle bracket M-shaped mounting base, c. a cradle bracket support strut adapted to be removably connected to a sidewall of the freight carrying bed of the pickup truck that adjustably mounts the cradle bracket, comprising:
   i. a U-shaped support channel which engages and adjustably mounts the M-shaped mounting base of the cradle bracket;
   ii. a cradle bracket support strut mounting bracket having a C-shaped groove that receives an end of the support channel and is adapted to secure it to a floor of the freight carrying bed of the pickup truck;

d. a mounting bracket removably affixed to a second end of the adjustable support beam, said bracket comprising:
   i. an upper body having a mounting hole that receives the second end of the adjustable support beam;
   ii. a retaining plate connected about the mounting hole that abuts the second end of the support beam resting in the mounting hole;
   iii. a mounting bracket M-shaped mounting base;

e. a mounting bracket support strut adapted to be removably connected to a side wall of the freight carrying bed of the pickup truck that adjustably mounts the mounting bracket, comprising:
   i. a U-shaped support channel which engages and adjustably mounts the M-shaped mounting base of the mounting bracket;
   ii. a mounting bracket support strut mounting bracket having a C-shaped groove that receives an end of the support channel and is adapted to secure it to a floor of the freight carrying bed of the pickup truck; and f. wherein the mounting bracket support strut is adapted to be connected to a portion of a side wall of the freight carrying bed of the pickup truck that is directly opposite the portion of the side wall which the cradle bracket support strut is connected to, whereby the second end of the adjustable support beam can enter the mounting hole in the mounting bracket and abut the retaining plate therein, while the first end of the beam rests within the cradle-shaped recess and abuts the securing plate in the cradle bracket.

9. The adjustable freight stacking support of claim 8, wherein the cradle bracket and mounting bracket are adjustably mounted on their respective support struts by a height adjusting rod and position slot arrangement comprising a plurality of pairs of height adjustment holes in ridges of the respective U-shaped support channels; corresponding position slots in ridges of the respective M-shaped mounting bases of the brackets; and height adjustment rods that pass through the position slots and aligned height adjustment holes thereby securing the cradle and mounting brackets at the height of the height adjustment holes in their support struts.

10. The adjustable freight stacking support of claim 8, wherein the first end of the adjustable support beam is secured within the cradle bracket by a securing post and pivotal latch assembly comprising a securing post in a bottom of an arcuate channel in the cradle bracket; a securing slot adjacent the first beam end; a pivotal latch; a notch in a first side of the arcuate channel in the cradle bracket; a pivot rod and encircling spring securing a pivot end of the pivotal latch within the notch; a latch slot in a second, opposed side of the arcuate channel; a latch end of the pivotal latch, whereby the pivotal latch is adapted to pivot upwardly to a vertical position, allowing the first beam end to lie within the arcuate channel with the securing post inserted in the beam end securing slot, and the pivotal latch is also adapted to pivot downwardly about the pivot rod and encircling spring to lie adjacent the beam end, thereby permitting the latch end to slide into the latch slot and be held in that position by the pressure exerted by the spring upon the pivotal latch in a direction parallel to the axis of rotation of the pivotal latch, while the second end of the adjustable support beam is secured within the mounting bracket by a securing rod and slot arrangement comprising a securing rod; a securing rod slot in the mounting bracket; and a securing rod slot adjacent the second beam end, whereby the securing rod passes through the securing rod slot and securing slot when the second beam end is within the mounting bracket and the securing slot adjacent the second beam end is aligned with the securing rod slot in the mounting bracket.

11. An adjustable freight stacking support apparatus for enhancing the durability and freight handling capacity of the freight carrying beds of pickup trucks, wherein the support comprises:
 a. an adjustable support beam having two ends;
 b. a cradle bracket removably affixed to a first end of the adjustable support beam, said bracket comprising:
  i. an upper body having a cradle-shaped recess that receives the first end of the adjustable support beam;
  ii. a securing plate connected about the cradle-shaped recess that abuts the first end of the support beam resting in the recess;
  iii. an M-shaped cradle bracket mounting base;
 c. a cradle bracket support strut adapted to be removably connected to a sidewall of the freight carrying bed of the pickup truck that adjustably mounts the cradle bracket, comprising:
  i. a U-shaped support channel which engages and adjustably mounts the M-shaped mounting base of the cradle bracket;
  ii. a cradle bracket support strut mounting bracket having a C-shaped groove that receives an end of the support channel and is adapted to secure it to a floor of the freight carrying bed of the pickup truck;
 d. a mounting bracket removably affixed to a second end of the adjustable support beam, said bracket comprising:
  i. an upper body having a mounting hole that receives the second end of the adjustable support beam;
  ii. a retaining plate connected about the mounting hole that abuts the second end of the support beam resting in the mounting hole;
  iii. an M-shaped mounting bracket base;
 e. a mounting bracket support strut adapted to be removably connected to a side wall of the freight carrying bed of the pickup truck that adjustably mounts the mounting bracket, comprising:
  i. a U-shaped support channel which engages and adjustably mounts the M-shaped mounting base of the mounting bracket;
  ii. a mounting bracket support strut mounting bracket having a C-shaped groove that receives an end of the support channel and is adapted to secure it to a floor of the freight carrying bed of the pickup truck;
 f. wherein the mounting bracket support strut is adapted to be connected to a portion of a side wall of the freight carrying bed of the pickup truck that is directly opposite the portion of the side wall which the cradle bracket support strut is connected to, whereby the second end of the adjustable support beam can enter the mounting bracket and abut the retaining plate therein, while the first end of the beam rests within the cradle-shaped recess and abuts the securing plate in the cradle bracket;
 g. wherein the first end of the adjustable support beam is secured within the cradle bracket by a securing post and pivotal latch assembly comprising a securing post in a bottom of an arcuate channel in the cradle bracket; a securing slot adjacent the first beam end; a pivotal latch; a notch in a first side of the arcuate channel in the cradle bracket; a pivot rod and encircling spring securing a pivot end of the pivotal latch within the notch; a latch slot in a second, opposed side of the arcuate channel; and a latch end of the pivotal latch, whereby the pivotal latch pivots upward to a vertical position, allowing the first beam end to lie within the arcuate channel with the securing post inserted in the beam end securing slot, and the pivotal latch pivots downward about the pivot rod and encircling spring to lie adjacent the beam end permitting the latch end to slide into the latch slot and be held in that position by the pressure exerted by the spring upon the pivotal latch in a direction parallel to the axis of rotation of the pivotal latch and the second end of the adjustable support beam is secured within the mounting bracket by a securing rod and slot arrangement comprising a securing rod; a securing rod slot in the mounting bracket; and a securing rod slot adjacent the second beam end whereby the securing rod passes through the securing rod slot and securing slot when the second beam end is within the mounting bracket and the securing slot adjacent the second beam end is aligned with the securing rod slot in the mounting bracket; and h. wherein the cradle bracket and mounting bracket are adjustably mounted on their respective support struts by a height adjusting rod and position slot arrangement comprising a plurality of pairs of height adjustment holes in ridges of the respective U-shaped support channels; corresponding position slots in ridges of the respective M-shaped mounting bases of the brackets; and height adjustment rods that pass through the position slots and aligned height adjustment holes thereby securing the cradle and mounting brackets at the height of the height adjustment holes in their support struts.

* * * * *